United States Patent Office 3,547,951
Patented Dec. 15, 1970

---

3,547,951
1,3-DIOXOLAN-4-YL-ALKYL GUANIDINES
Waldo R. Hardie, 2061 Strand Road, Walnut Creek,
Calif. 94596, and Joseph E. Aaron, 904 Bancroft Way,
Berkeley, Calif. 94710
No Drawing. Continuation-in-part of application Ser. No.
547,194, May 3, 1966. This application June 17, 1969,
Ser. No. 834,174
Int. Cl. C07d 13/04
U.S. Cl. 260—340.9      6 Claims

ABSTRACT OF THE DISCLOSURE 1,3-dioxolan-4-yl-alkyl-guanidines substituted at the two-position of the dioxolane ring with hydrogen, alkyl, substituted alkyl, a carbocyclic ring system, or a spirocyclic ring system in which the two-position carbon atom of the dioxolane ring is a ring carbon atom thereof, are prepared by converting a 1,3-dioxolan-4-yl-alkylamine to a guanidine by reaction with thiopseudourea. The amine is prepared by reacting a halide group with a metallo salt of phthalimide followed by hydrolysis. The guanidines have pharmacological activity which includes anti-hypertensive activity.

---

This application is a continuation-in-part of copending application Ser. No. 547,194, filed May 3, 1966, now abandoned.

This invention relates to novel dioxolanyl-substituted guanidines. More particularly, it relates to 1,3-dioxolan-4-yl-alkyl-guanidines having anti-hypertensive activity.

PRIOR ART

Substituted guanidines having anti-hypertensive activity are known in the art. Examples of these are coumaranyl and indanyl substituted guanidines (U.S. 3,153,057), benzodioxanyl guanidines [Augstein and Green, Nature, 201, 628 (1964)], and benzo-1,3-dioxolyl-2-guanidines (U.S. 3,149,129). 1,3-dioxolanes substituted at the 4-position with a piperidine group are also known (U.S. 3,262,938).

SUMMARY OF THE INVENTION

The invention sought to be patented resides in the concept of anti-hypertensive agents having the dioxolanyl-alkyl-guanidine structure in which a 1,3-dioxolane group is attached by its 4-position ring carbon atom via a lower-alkylene bridge to the guanidine amino nitrogen atom.

The tangible guanidine embodiments of this invention, in their free base and acid addition forms, are novel chemical compounds whose utility includes the inherent applied use characteristic of exhibiting pharmacological activity, including anti-hypertensive activity, as evidenced by pharmacological evaluation according to standard test procedures and evaluations.

DETAILED DESCRIPTION OF THE INVENTION

(A) Products of this invention

The following is a description of the compounds of this invention which are defined by the following formula:

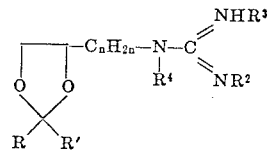

wherein $n$ is an integer from 1–8, preferably 1–4, most preferably 1, $R^2$, $R^3$ and $R^4$ each are hydrogen or lower-alkyl of 1–8, preferably 1–4, carbon atoms, e.g., methyl, ethyl, propyl, isopropyl, butyl, isobutyl, tertiary butyl, and R and R', which have a collective molecular weight less than 300, preferably less than 200, and are alike or different, each are hydrogen, lower-alkyl of 1–8, preferably 1–4, carbon atoms, more preferably ethyl or isopropyl, substituted lower-alkyl, e.g., hydroxy-lower-alkyl, e.g., $\beta$-hydroxyethyl, $\beta$-hydroxypropyl, $\gamma$-hydroxypropyl, halo-lower-alkyl, e.g., $\beta$-chloroethyl, $\beta$-bromoethyl, 2-iodo-ethyl, 2-fluoro-n-propyl-, and lower-alkoxy-lower-alkyl, e.g., methoxyethyl, ethoxyethyl, $\beta$-ethoxypropyl, an aryl or cycloalkyl carbocyclic ring substituent or collectively with the 2-position carbon atom of the dioxolane ring, a spirocarbocyclic ring substituent in which the 2-position carbon atom of the dioxolane ring is a ring carbon atom thereof.

The term "carbocyclic ring substituent" means one in which all the ring members thereof are carbon atoms. In the compounds of this invention they can be monocyclic or polycyclic, i.e., containing up to 3 rings, and can contain a total of up to 15 carbon atoms. In the compounds of this invention R and R' each can be cycloalkyl, i.e., the substituent is attached by a non-aromatic ring carbon atom, or aryl, i.e., the substituent is attached by an aromatic ring carbon atom; or collectively R and R' and the 2-position carbon atom of the dioxolane ring can form the spirocyclic ring, i.e., R and R' collectively are alkylene of, e.g., 4–9 carbon atoms, which can have one or two benzo rings fused thereto, e.g., to form an indanylidene or fluorenylidene substituent. Examples of cycloalkyl ring substituents are cyclopropyl, cyclobutyl, cyclopentyl, cyclohexyl, cycloheptyl, 1,4-methylenecyclohexyl, cyclooctyl, cyclononyl, indanyl, 2-indanyl, hexahydroindanyl, tetrahydronaphthyl, decahydronaphthyl, perhydroanthracenyl and perhydrophenanthryl and 10,11-dihydro-5-H-dibenzo(a,d)cycloheptanyl. Examples of aryl ring substituents are phenyl, biphenyl, p-benzylphenyl, 4-indanyl, 5-indanyl, naphthyl, 5,6,7,8-tetrahydronaphthyl, fluorenyl, acenaphthyl, anthracenyl and phenanthryl. Of these, those in which the ring is a benzene ring are preferred. The carbocyclic ring substituent can be a combination of cycloalkyl and aryl, e.g., indanyl and tetrahydronaphthyl attached by either the benzene or cycloalkyl ring. Examples of spirocyclic rings in which the 2-position carbon atom of the dioxolane ring is a ring carbon atom thereof are cyclopentylidene, cyclohexylidene, cycloheptylidene, cyclooctylidene, cyclononylidene, indanylidene, and 9-fluorenylidene.

The cycloalkyl or aryl ring substituent can be attached directly by a ring carbon atom thereof to the 2-position ring carbon atom of the dioxolane ring or separated by a lower-alkylene bridge containing 1–8 carbon atoms in the chain, preferably 1–4 and most preferably one carbon atom. Examples of such cyclic systems in which the carbocyclic ring is separated by a carbon chain are aralkyl, e.g., benzyl, diphenylmethyl, triphenylmethyl, phenethyl, α-phenylethyl, α- and β-phenylpropyl and α-cyclopentylbenzyl, cycloalkylalkyl, e.g., cyclohexylmethyl and dicyclohexylmethyl, γ-cyclopentylpropyl. Of this class, preferred are benzyl and diphenylmethyl.

Especially preferred are compounds containing a spirocyclic ring system wherein the 2-position carbon atom of the dioxolane ring is a carbon atom of a cycloalkyl ring substituent. The term "lower," e.g., when used in "lower-alkyl," means containing up to eight carbon atoms, inclusive.

The utility of the compounds of this invention as pharmacologics is the result of the novel molecular combination of 1,3-dioxolane with guanidines via a lower-alkylene group. While the manifestation of this activity varies in degree and character from member to member in this series in the usual manner expected of the compounds of any series having pharmacological activity, the series of compounds embraced within this invention are all useful as pharmacologics.

Because novelty and utility of the compounds are the result of the molecular combination of the 1,3-dioxolane structure joined by an alkylene bridge with the guanidine structure, embraced within the scope of the compounds having this structural combination are those having one or more, usually not more than four and preferably not more than three, simple substituents on the R and R' substituents. Those which can be on a carbon atom thereof include halo, e.g., chloro, bromo and fluoro, lower-alkyl including methyl, ethyl, propyl and octyl, trifluoromethyl, trichloromethyl, lower-alkoxy including methoxy and ethoxy, aryloxy and aralkoxy including benzyloxy and phenoxy, hydroxy, carboxy, carbo-lower-alkoxy, nitro, sulfato and acetamido. The nitrogen atoms of the guanidine structure can bear hydrogen atoms or, less preferably, can be substituted, e.g., with lower-alkyl including methyl, ethyl, propyl, butyl, octyl. Preferably, so that the activity and characteristic structure is predominately that of a 1,3-dioxolan-4-yl-alkylene-guanidine, the sum of the molecular weight of these substituents is less than the sum of the molecular weights of the dioxolane and its 2-position substituents, e.g., less than 200 and more preferably less than 150, so that the resulting compounds have a total molecular weight of less than 500, preferably less than 400.

Preferred classes of compounds within this invention are the 1,3-dioxolan-4-yl-lower-alkyl-guanidines meeting one or more of the following requirements: (a) other than the 2-position of the dioxolane ring the compound is unsubstituted; (b) other than the guanidine nitrogen atoms and the dioxolane ring oxygen atoms, the compounds are hydrocarbon; (c) the lower-alkylene bridging group is methylene; (d) the valences of the 2-position dioxolane carbon atom are satisfied by non-aromatic hydrocarbon substituents, e.g., lower-alkyl, or more preferably by a single spiro carbocyclic ring which bears at most a single substituent which is preferably non-aromatic; (e) the compounds are in their acid addition salt form, preferably as their hydrochloride or sulfate or other pharmaceutically acceptable acid addition salt.

The compounds of this invention possess asymmetric carbon atoms. They can thus exist as a mixture of its optical isomers or by conventional separation techniques, in the form of an optical isomer substantially free from the other isomers.

(B) General process of preparation

The following is a description of methods for making the compounds of this invention.

*Procedure 1.*—The 1,3 - dioxolan - 4 - yl - methylguanidines of this invention can be prepared from 1,3-dioxolan-4-yl-methylhalides by a series of reactions which are illustrated schematically as follows:

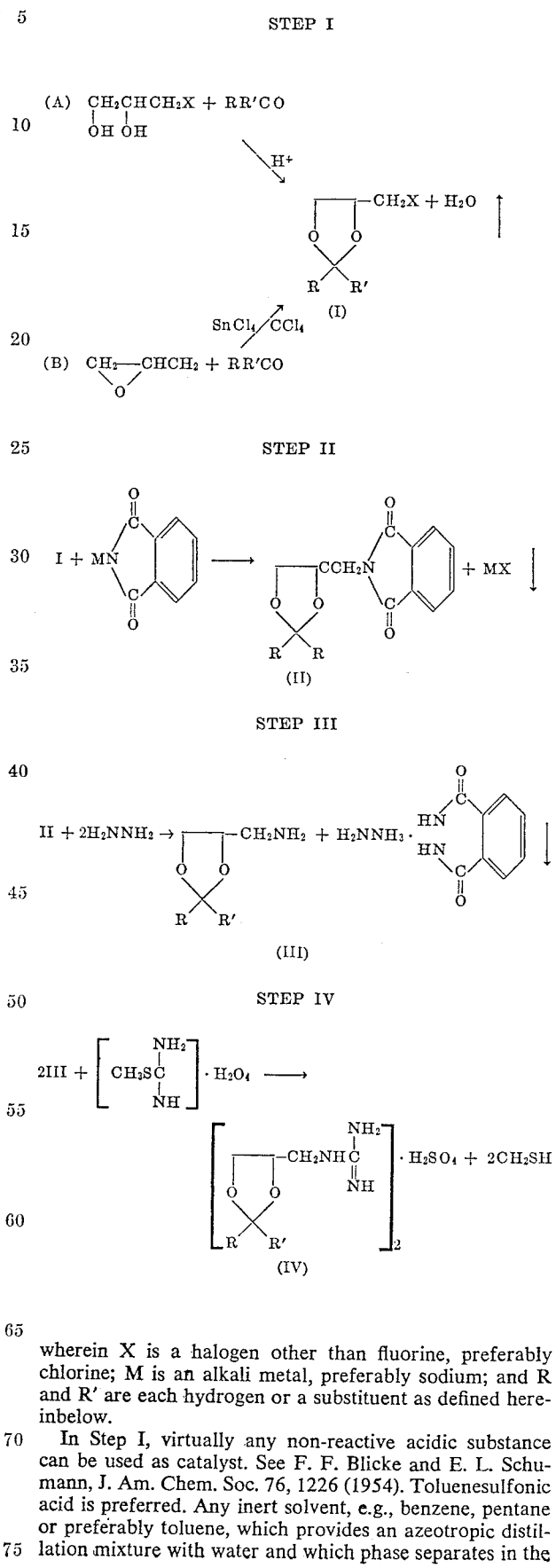

wherein X is a halogen other than fluorine, preferably chlorine; M is an alkali metal, preferably sodium; and R and R' are each hydrogen or a substituent as defined hereinbelow.

In Step I, virtually any non-reactive acidic substance can be used as catalyst. See F. F. Blicke and E. L. Schumann, J. Am. Chem. Soc. 76, 1226 (1954). Toluenesulfonic acid is preferred. Any inert solvent, e.g., benzene, pentane or preferably toluene, which provides an azeotropic distillation mixture with water and which phase separates in the Dean-Stark trap can be used. Step I(A) is preferred over Step I(B). In Step I(B), neutral inert solvents are used, e.g., $CCl_4$ or other chlorinated hydrocarbon.

In Step II, dry solvents should be used. N,N-dialkyl acid amides, e.g., dimethyl formamide and dimethyl acetamide, appear to catalyze the reaction. Alkanols, e.g., ethanol, are also useful solvents. Sodium is the preferred metallo salt of the phthalimide, although other salts such as the more readily available potassium phthalimide may also be used.

In Step III, aqueous, hydrated or anhydrous hydrazine can be used. 95 percent ethanol is a useful solvent although any inert solvent for Intermediate II can be used. At least one mole and preferably two moles of hydrazine per mole of the substituted phthalimide is preferably employed. Hydrolysis in alcoholic alkali-metal hydroxide is effective but gives lower yields than hydrazine. If desired, product (III) can readily be converted to a secondary lower alkyl substituted amine by methods commonly employed in the art prior to proceeding with Step IV.

Step IV is the preferred method of producing the final products of this invention. Possible variations are the use of other thiopseudoureas such as benzyl-thiopseudourea (U.S. 3,027,370); ammonia to promote the reaction [Fielding et al., Brit. J. Pharmacol. 24, 395 (1965)]; an acid addition salt of the amine (III) and a thiopseudourea base; use of mono- or di-substituted, e.g., lower-alkyl substituted, thiopseudoureas, of the type described by McKay et al., J. Med. Chem. 6, 592 (1953); 2-methyl-thioimidazoline [Short et al., J. Med Chem. 6, 283 (1953)]; and the use of 3,5-dimethyl-1-guanyl-pyrazole, [Can. J. Biochem. Physiol. 38, 493 (1960); Scott et al., J. Am. Chem. Soc. 75, 4053 (1953)]; cyanamide [Braun, J. Am. Chem. Soc. 55, 1291 (1933)] or guanidine base and tosylate esters [Monroe, Chem. and Ind., 43, 1806 (1964)].

*Procedure 2.*—Means for preparing the guanidines of this invention in which the bridging alkyl group is higher than methyl is by reduction of the corresponding nitrile compound to produce the corresponding primary amine, which is then converted to the corresponding guanidine in the manner described in Procedure 1.

A 1,3-dioxolan-4-yl-lower-alkylnitrile is prepared according to the method of J. Boileau et al., Bull. Soc. Chim. France 3, 338 (1957), and W. R. Hardie et al., J. Med. Chem. 9, 132 (1966), by stirring a mixture of a compound of the formula

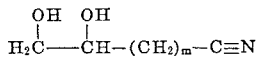

wherein *m* is an integer from 1–7, preferably 1–3, and most preferably 1 or 2, with an acetal, substituted with carbocyclic groups which correspond to the 2-position substituents of the dioxolane, in the presence of an acid catalyst, preferably p-toluenesulfonic acid at room temperature or alkanol reflux temperature.

The resultant 1,3-dioxolan-4-yl-alkylnitrile is reduced to the corresponding amine either by catalytic reduction with hydrogen or by chemical means, e.g., with lithium aluminum hydride.

The resultant amine is then coverted to an acid addition salt by means well known in the art.

The 1,3-dioxolan-4-yl-alkylnitrile is also prepared by substituting the desired nitrile of the formula

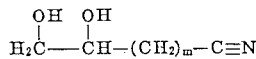

wherein *m* is defined above, for the 3-chloro-1,2-propanediol in the method described in Step I Procedure A of Preparation 1.

*Procedure 3.*—A further means for preparing the guanidines of this invention is through the methane sulfonate ester, according to the following sequence of reactions:

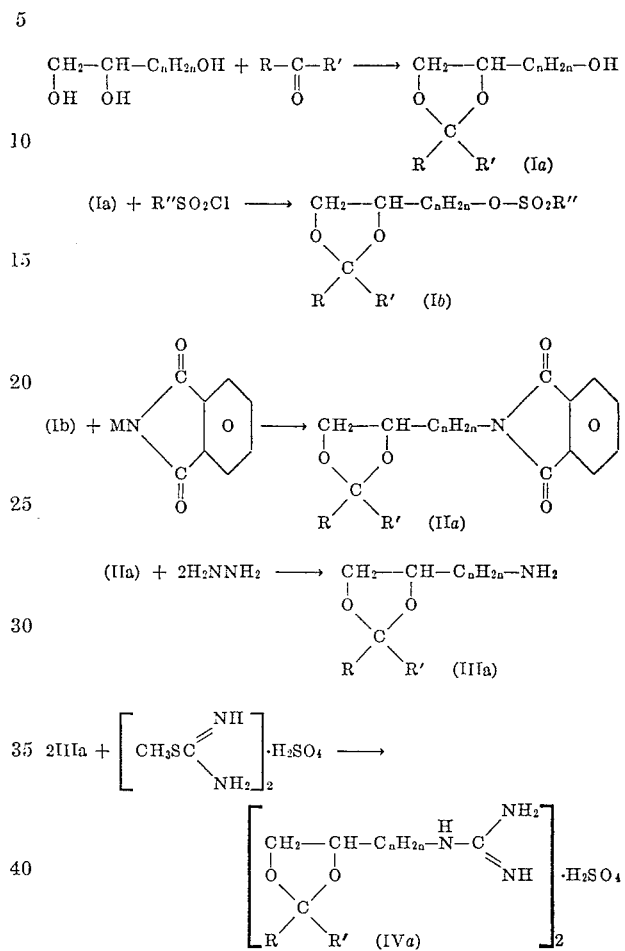

In the above formulae *n*, R and R' have the values given above in the definition of the compounds of this invention and R″ is lower-alkyl, e.g., methyl or monocyclic or dicyclic carbocyclic aryl, aryl, e.g., phenyl, p-tolyl, naphthyl.

According to the above procedure, an aliphatic triol is condensed with a ketone or aldehyde or a lower-alkyl acetal thereof according to the method of Step I*a* of Procedure 1 to produce a 1,3-dioxolan-4-yl-loweralkanol (I*a*). Reaction of this alkanol with a sulfonyl chloride of the formula R″—$SO_2$Cl wherein R″ is lower-alkyl or carbocyclic aryl, e.g., methane-, phenyl-, or toluene-sulfonyl chloride, produces the corresponding sulfonate ester of the alkanol (I*b*). Reaction of the thus-produced sulfonate ester with an alkali metal phthalimide according to the method of Step II of Procedure 1 produces the corresponding 1,3-dioxolan-4-yl-lower-alkyl-phthalimide (II*a*). Reaction of this compound with hydrazine according to the procedure of Step III of Procedure 1 produces the corresponding 1,3-dioxolan-4-yl-lower-alkylamine (III*a*). Reaction of this compound with an acid addition salt of thiopseudourea produces the corresponding acid addition salt of a 1,3-dioxolan-4-yl-lower-alkyl guanidine (IV*a*) of this invention.

A phthalimide (II*a*), particularly one wherein R and R' are hydrogen or lower-alkyl, produced in the above-described manner, can be used to produce a variety of other phthalimides (II*a*) by hydrolyzing the dioxolane ring, e.g., with a catalytic amount of p-toluenesulfonic acid or a mineral acid in an aqueous propanol solution, to produce the corresponding glycol of the formula:

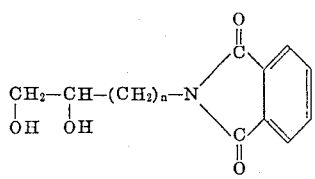

This glycol can then be reacted with a ketone or aldehyde of the formula R—CO—R' wherein R and R' have the values given above, or lower-alkyl acetal thereof, to produce another phthalimide (IIa) intermediate for producing a guanidine of this invention.

The 1,3-dioxolan-4-yl-lower-alkyl amines (IIIa) can be produced directly from the corresponding sulfonate ester of the 1,3-dioxolan-4-yl-lower-1-alkanol (Ib) by reaction with a large excess of anhydrous ammonia under pressure, e.g., at 0 to 70° C.

The optical isomers of the racemates produced when R and R' are different can be separately obtained by starting with an optically active triol following the procedure of Procedure 3. The individual isomers of the resulting mixture of optically active antipodes can then be separated by fractional crystallization.

(C) Utility

The following is a description of the method of using the compounds of this invention.

The 1,3-dioxolan-4-yl-lower-alkyl-guanidines of this invention are useful in scientific research, particularly in the field of pharmacology. Their pharmacological activity renders them useful in modifying body functions in laboratory test animals and other mammals by a modification of nerve impulses, e.g., the sympathetic nervous system. This activity manifests itself in laboratory tests utilized to detect sympathetic nervous system blocking activity, i.e., one or more of carotid occlusion, nictitating membrane and norepinephrine depletion tests.

In the Carotid Occlusion Test, a dog is anesthetized with 20 mg./kg. of thiopental and maintained with 60 mg./kg. of chloralose by IV injection. The femoral arteries and vein are catheterized and the common carotid arteries are isolated for bilateral clamping. After determining the control arterial pressor response to 30 seconds of carotid occlusion, the test compound is administered and the response is again measured. The dose which produces approximately a 40 percent inhibition of the pressor response is used for potency comparison with other drugs.

In the Nictitating Membrane Test, a cat is anesthetized with Dialurethane (0.9 cc./kg. I.P.), with the femoral artery and vein catheterized. The nictitating membrane is drawn out and attached to a thread fastened to a force-displacement transducer. The pre-ganglionic nerve to the superior cervical ganglion is isolated for stimulation by supra maximal electrical shock. After determining the control response to pre-ganglionic stimulation, the drug is administered by intravenous injection and the dose which produces at least a 10 percent reduction in response is used for potency comparison with other test drugs.

In the Norepinephrine Depletion Test, albino guinea pigs weighing 200 to 300 g. are treated with the drug in three test groups, i.e., control, 5 mg./kg. I.P., and 10 mg./kg. I.P., and then sacrificed after 15 to 18 hours. Quickly the hearts were removed, flushed with saline, placed in a vial and frozen in a dry ice-acetone bath. The hearts are individually analyzed for norepinephrine by the method of J. R. Crout, J. Pharmacol. 132, 269 (1961) and the level of depletion below control levels compared with other test drugs.

The compounds of this invention manifest fewer of the undesirable side effects of other known guanidyl antihypertensive agents, e.g., diarrhea.

When the compositions of this invention are used as pharmaceuticals, they can be administered orally in the form of pills, tablets, capsules, e.g., in admixture with talc, starch, sugar, milk sugar, or other inert diluent, i.e., non-toxic or pharmacologically acceptable pharmaceutical carrier, or in the form of aqueous solutions, suspensions, encapsulated suspensions, gels, elixirs, aqueous alcoholic solutions, e.g., in admixture with sugar or other sweetening agent, flavorings, colorants, thickeners, and other conventional pharmaceutical excipients. When injected subcutaneously, intravenously or intramuscularly, usually the latter, they can be administered, e.g., as an aqueous or peanut oil solution or suspension using excipients and carriers conventional for this mode of administration. The best route of administration and the best dosage will be apparent from the laboratory tests for activity and toxicity of the selected compound conventionally undertaken as part of the development phase of a pharmaceutical.

DETAILED DESCRIPTION

In the following preparations and examples, which are illustrative of the process and products of this invention, temperatures are in degrees centigrade.

STEP I

Preparation 1(a)—2-chloromethyl-1,4-dioxaspiro [4.5]decane

The preparations of this intermediate compound are illustrative of the methods used to make each of the corresponding first step intermediates leading to the guanidines described in the Examples. The first procedure is preferred.

Procedure A

In a reflux distillation apparatus [See F. F. Blicke and E. L. Schumann, J. Am. Chem. Soc. 76, 1226 (1954)] equipped with a Dean-Stark trap was placed 442 g. of 3-chloro-1,2-propanediol and 4 g. of p-toluene sulfonic acid and 1300 ml. of toluene. After reflux had been established, 392 g. of cyclohexanone was added dropwise during a period of 30 minutes. The mixture was then refluxed for 6 hours until water ceased to accumulate in the trap. A total of 68 ml. of water was collected. The solution was cooled and the pH adjusted to neutrality with sodium methylate and filtered. The filtrate was distilled, removing the toluene first and then 2-chloromethyl-1,4-dioxaspiro[4.5]decane, $N_D^{25}$ 1.4754, at 112–116°/14.5 mm.

Procedure B

Using the method of F. F. Blicke and F. E. Anderson, J. Am. Chem. Soc. 74, 1735 (1952), this reaction is generally applicable to this group of intermediates. In a reaction flask equipped with a large stirrer, ice bath, dropping funnel, and protected from moisture by drying tubes, was placed 200 g. of cyclohexanone, 200 g. of epichlorohydrin, and 500 ml. of anhydrous carbon tetrachloride. When the solution had cooled to 10°, 67 g. of stannic chloride was added dropwise over a period of 2.5 hours with stirring. After another hour of stirring at room temperature, 69.8 g. of potassium hydroxide in 300 ml. of water was added at a temperature of 5 to 10°. After standing some hours, the aqueous phase was decanted and extracted with ether. The combined carbon tetrachloride and ether solutions were dried over anhydrous potassium carbonate and distilled. The portion boiling at 118 to 124°/15 mm., $N_D^{25}$ 1.4750, was used.

*Analysis.*—Calculated for $C_9H_{15}ClO_2$ (percent): Cl, 18.6. Found (percent): Cl, 18.06.

STEP II

Preparation 1(b)—2-(phthalimidomethyl)-1,4-dioxaspiro[4.5]decane.

The preparation of this phthalimido derivative is illustrative of the general procedure which was satisfactory for all such intermediates. See J. H. Billman and R. Vincent Cash, J. Am. Chem. Soc. 75, 2500 (1953).

A 9.1 g. portion of sodium hydride (52.3% in mineral oil suspension) was slurried with about 80 ml. of anhydrous dimethylformamide, and then 29.4 g. of phthalimide was transferred gradually to the reaction mixture from an attached flask connected by tubing to form a closed system. After an additional period of about one hour at temperatures varying up to 70°, 38.1 g. of 2-chloromethyl - 1,4 - dioxaspiro[4,5]decane was added together with 0.5 g. of sodium iodide (optional) in 20 ml. of dry dimethylformamide, and the mixture was heated at reflux for 5 hours and then filtered hot leaving 10.8 g. of sodium chloride on the filter. Reaction is practically complete after 2 hours at reflux. Reaction at 125° appears to require at least 24 hours for a similar yield. The filtrate was evaporated at reduced pressure on the steam bath to an oily residue which was diluted with 200 ml. of benzene and filtered. The filtrate was washed once with 100 ml. of 1% aqueous sodium hydroxide and 3 times with 300 ml. of water. The benzene was removed at reduced pressure on the steam bath and the residue triturated with petroleum ether, whereupon it crystallized to give 2-phthalimido methyl) - 1,4 - dioxaspiro[4,5]decane, melting at 87–90. Crystallization may also be induced with isopropanol.

This compound was also made by a similar procedure but using commercial potassium phthalimide reagent in place of the sodium phthalimide used in the procedure described above. 102 grams of 2-chloromethyl-1,4-dioxaspiro[4.5]decane, 121 g. potassium phthalimide, 6 g. of potassium iodide, and 500 ml. of anhydrous dimethyl formamide were mixed and refluxed gently for approximately 16 hours with the reflux condenser closed by a calcium chloride drying tube. The solution was filtered hot, and 48.1 g. of potassium chloride was recovered. The filtrate was diluted with 500 ml. of water which precipitated an oil. The aqueous portion was extracted twice with 250 ml. portions of chloroform which were combined and mixed with the oily precipitate. This chloroform was then washed with water, dried with magnesium sulfate, and evaporated to an oil which crystallized when triturated with isopropanol. The crude product was recrystallized from ethanol and the crystals washed with 50 ml. of 8% aqueous sodium hydroxide, followed by a wash with 50 ml. of water, and then dried to give 2-(phthalimidomethyl)-1,4-dioxaspiro[4,5]decane, melting at 91–92°.

*Analysis.*—Calculated for $C_{17}H_{19}NO_4$ (percent): C, 68.03; H, 6.38. Found (percent): C, 68.20; H, 6.52.

STEP III

Preparation 1(c)—1,4-dioxaspiro[4.5]decane-2-methylamine sulfate 20.3 grams of 2-phthalimidomethyl-1,4-dioxaspiro[4.5]decane and 4.5 ml. of hydrazine (95% anhydrous) were heated at reflux in 300 ml. of ethanol with vigorous stirring for one hour. The cooled slurry was diluted with 200 ml. of dry ether, filtered, and the precipitate was washed twice with 100 ml. portions of ether. The combined filtrates and washes were evaporated to 100 ml. of residue and diluted with 100 ml. of fresh ether and refiltered. The filtrate was evaporated to an oily residue which was dissolved in 10 ml. water and adjusted to pH 6.0 with 50% sulfuric acid. A precipitate formed and was filtered, washed with ether, and dried to give 1,4-dioxaspiro[4.5]decane-2-methylamine sulfate, melting at 237.5–239.5°.

*Analysis.*—Calculated for $(C_9H_{17}NO_2)_2 \cdot H_2SO_4$ (percent): C, 49.07; H, 8.24; N, 6.36; S, 7.28. Found (percent): C, 48.75; H, 8.37; N, 6.32; S, 6.98.

The oily residue is usually of suitable purity and is in the desired free base form for use in the Step IV reaction, and therefore can be used as such. For further purification when necessary the amines can be distilled or converted to sulfate salts or both.

Preparation 2—2-ethyl-2-phenyl-1,3-dioxolan-4-yl-ethylamine

The following exemplifies another means of preparing the amines of this invention by reduction of the corresponding nitrile compound.

Procedure A

*Step I.*—2 - ethyl - 2 - phenyl - 1,3 - dioxolan - 4 - acetonitrile was prepared by stirring a mixture of 10 g. of 3,4-dihydroxybutyronitrile with 20 g. of 1-phenyl-1,1-dipropoxypropane at room temperature in the presence of 0.05 g. of p-toluenesulfonic acid for a period of approximately three hours. A precipitate was separated by filtration, washed with pentane and recrystallized from pentane to give the nitrile, M.P. 59–60.5°.

*Analysis.*—Calculated for $C_{13}H_{15}NO_2$ (percent): C, 71.86; H, 6.96; N, 6.45. Found (percent): C, 71.86; H, 6.67; N, 6.61.

3,4-dihydroxybutyronitrile may be prepared by the method of J. Boileau and co-workers, Bull. Soc. Chim., France, 3, 338 (1957). 1-phenyl-1,1-dipropoxypropane was prepared by the method of W. R. Hardie and co-workers, J. Med. Chem., 9, 132 (1966).

*Step II.*—A solution of 18 g. of 2-ethyl-2-phenyl-1,3-dioxolan-4-acetonitrile was prepared in 180 ml. of anhydrous ethanol containing 15 g. of ammonia. To this reaction mixture was added 3 g. of 5 percent rhodium on alumina and the mixture was subjected to 50 p.s.i. of hydrogen and shaken for a period of approximately three hours in a Paar apparatus. The reaction solution was filtered, evaporated at 15 mm. pressure and the oily residue was distilled to give 2-ethyl-2-phenyl-1,3-dioxolan-4-ethylamine, B.P. 94–97°/1 mm.

*Analysis.*—Calculated for $C_{13}H_{19}NO_2$ (percent): C, 70.56; H, 8.65; N, 6.33. Found (percent): C, 70.46; H, 8.71; N, 6.19.

*Step III.*—A solution of the 0.01 mole of the amine in 25 ml. of anhydrous ether was treated with 0.01 mole of p-toluene-sulfonic acid dissolved in 50 ml. of anhydrous ether. The precipitate was filtered, washed with ether and recrystallized from 175 ml. of absolute alcohol to give the corresponding p-toluene-sulfonic salt, M.P. 122–124° C.

*Analysis.*—Calculated for $C_{13}H_{19}NO_2 \cdot C_7H_8O_3S$ (percent): C, 61.05; H, 6.92; N, 3.56. Found (percent): C, 60.95; H, 6.79; N, 3.48.

Procedure B

*Step I.*—1,4 - dioxaspiro[4.5]decane-2-acetonitrile was made by the method described in Step I, Procedure A of Preparation 1a, using 3,4-dihydroxybutyronitrile in place of 3-chloro-1,2-propanediol, B.P. 98–103°/2 mm.

*Analysis.*—Calculated for $C_{10}H_{15}NO_2$ (percent): C, 66.27; H, 8.34; N, 7.73. Found (percent): C, 66.01; H, 8.44; N, 7.98.

*Step II.*—To a 500 ml. flask containing dry nitrogen and fitted with stirrer, dropping funnel and condenser, was added 8 g. of lithium aluminum hydride and 200 ml. of anhydrous ether. The suspension was stirred and treated dropwise with 36 g. of 1,4-dioxaspiro[4.5]decane-2-acetonitrile at reflux during a period of 30 minutes. After stirring a few hours, 8 ml. of water, 6 ml. of 20 percent aqueous sodium hydroxide and 28 ml. of water were successively added followed by filtration of the resulting precipitate. The filtrate was evaporated to give 1,4-dioxaspiro[4.5]decane-2-ethylamine as an oil, B.P. 98–103°/2 mm.

*Analysis.*—Calculated for $C_{10}H_{19}NO_2$ (percent): C, 64.82; H, 10.34; N, 7.56. Found (percent): C, 65.09; H, 10.49; N, 7.65.

*Step III.*—A solution of 13 g. of the amine in 50 ml. of anhydrous ether was treated with 3.45 g. of concentrated sulfuric acid dissolved in 50 ml. of anhydrous ether. The precipitate was filtered, washed with ether and recrystallized from 300 ml. of absolute ethanol to give its sulfate salt, M.P. 250° decomposition.

*Analysis.*—Calculated for $(C_{10}H_{19}NO_2)_2H_2SO_4$ (percent): C, 51.26; H, 8.60; N, 5.98. Found (percent): C, 51.13; H, 8.48; N, 5.72.

Preparations 3–26

The following table gives the melting point and/or boiling point of other intermediates prepared by the above procedures and used to prepare the compounds of the examples.

TABLE I

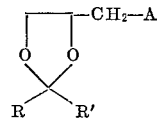

| | | | Step I | Step II | Step III |
|---|---|---|---|---|---|
| | | | —Cl | N-C₆H₄ phthalimide | —NH₂ |
| Compounds | R | R' | B.P. (mm.) M.P. | M.P., degrees | M.P. salt (B.P. (mm.) base) |
| 3 | —(CH₂)₅— | | 114°/14, 5 | 90–93 | 234–236° (H₂SO₄). |
| 4 | —CHCl —(CH₂)₄— ] | | 143–4°/12 | 112–115 | 225–227° (H₂SO₄). |
| 5 | —(CH₂)₂ —(CH₂)₂ ] CHCH₃ | | 122–130°/12 | | {246–247° (H₂SO₄). (91–110°/0.6). |
| 6 | —CH₂—C(CH₃)₂ CH₂ —CH₂—C(CH₃)₂ | | 137–140°/12 | 90–92 | |
| 7 | —(CH₂)₂ —(CH₂)₂ ] CHOCH₃ | | | | {248–249° dec. (H₂SO₄). |
| 8 | —CH—(CH₂)₄— C₆H₅ | | 109–120°/0, 1 | 80–90 | {203–205° dec. (H₂SO₄). |
| 9 | —(CH₂)₆— | | 120–125°/12 | 93–95 | 232° (H₂SO₄). |
| 10 | —(CH₂)₇— | | 145°/13 | | {230–231° (H₂SO₄). (80–84°/0, 1). |
| 11 | —CH₂—o-C₆H₄—CH₂— | | {(49–51°) 114°/0, 9 | | |
| 12 | —(CH₂)₄— | | 99–100°/11 | 96–99 | {234–235° dec. (H₂SO₄). (65–70°/0, 15). |
| 13 | H | H | | 73–75 | {171, 5° (HCl). (70–75°/17). |
| 14 | CH₃ | CH₃ | 45–50°/12 | | (60–65°/12). |
| 15 | C₂H₅ | C₂H₅ | 75–80°/12 | 44–46 | {221–223° (H₂SO₄). (89–90°/12). |
| 16 | i—C₃H₇ | i—C₃H₇ | 107–112°/19 | | 188–190° dec. (HCl). |
| 17 | n—C₃H₇ | n—C₃H₇ | 105°/12 | | (105–123°/12). |
| 18 | C₆H₅ | C₆H₅ | (52–54°) | 129–130 | 230° (HCl). |
| 19 | C₆H₁₁ | C₆H₁₁ | 119–122°/0, 5 | | |
| 20 | C₆H₅ | C₂H₅ | 100–108°/1, 5 | 86–90 | 164–166, 5° (succinate). |
| 21 | C₆H₅ | CH₃ | 99–100°/1, 5 | 94–112 | 201–204° (H₂SO₄). |
| 22 | C₆H₅ | n—C₃H₇ | 132–134/4 | | 136. 5–155° (plus tartarate). |
| 23 | o-CH₃OC₆H₄ | H | 162–171°/4. 3 | 93–105 | {126–129°. (p-TSO). |
| 24 | p-CH₃OC₆H₄ | H | 147–151°/1 | 99–110 | {142–144°. (H₂SO₄). |
| 25 | p-F—C₆H₄ | C₂H₅ | 105–109°/1. 3 | 80–100 | {165.3–167.3°. (H₂SO₄). |
| 26 | p-CH₃OC₆H₄ | C₂H₅ | 130–134°/0. 9 | 70–93 | {156–160°. (H₂SO₄.) |

Preparations 27–42

The following table gives the melting and/or boiling point for amine intermediates or acid addition salts thereof which are reacted in the manner described hereinafter to form the corresponding guanidine. All temperatures are in centigrade.

TABLE II

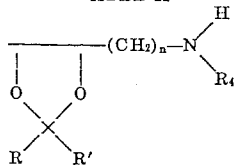

| | R | R' | R4 | n | M.P. (B.P. (mm.) base |
|---|---|---|---|---|---|
| 27 | p-CH$_3$OC$_6$H$_4$ | C$_2$H$_5$ | H | 2 | (138–145°/0.6.) |
| 28 | CH$_3$ | C$_6$H$_5$ | H | 2 | (101–140°/0.7.) |
| 29 | C$_2$H$_5$ | m-CF$_3$C$_6$H$_5$ | H | 2 | (101–103°/0.5.) |
| 30 | C$_2$H$_5$ | p-CH$_3$—C$_6$H$_5$ | H | 2 | (123–125°/0.5.) |
| 31 | C$_2$H$_5$ | p-Cl—C$_6$H$_5$ | H | 2 | (132–135°/0.6.) |
| 32 | CH$_3$ | CH$_3$ | H | 2 | (77–78°/13.5.) |
| 33 | C$_2$H$_5$ | C$_6$H$_5$ | H | 3 | (102–108°/0.3.) |
| 34 | H | C$_6$H$_5$ | H | 1 | 178–179(H$_2$SO$_4$.) |
| 35 | C$_6$H$_5$ | C$_6$H$_5$ | H | 2 | 195.5–196° (HCl). |
| 36 | H | p-ClC$_6$H$_5$ | H | 1 | 166–168° (H$_2$SO$_4$). |
| 37 | C$_6$H$_5$ | n-C$_4$H$_9$ | H | 2 | (110–112°/0.25 mm.) 140–141.2° (benzoate). |
| 38 | n-C$_3$H$_7$ | C$_6$H$_5$ | H | 2 | (108–110°/0.4 mm.) 159–160.5 (benzoate). |
| 39 | i-C$_3$H$_7$ | C$_6$H$_5$ | H | 2 | 161.5–163.0 (benzoate). |
| 40 | C$_2$H$_5$ | C$_6$H$_5$ | H | 2 | (94–97°/1.0 mm.) |
| 41 | —(C$_2$H$_2$)$_5$— | | H | 2 | Ca. 250° (H$_2$SO$_4$). |
| 42 | C$_6$H$_5$ | C$_2$H$_5$ | C$_2$H$_5$ | 1 | 176–177° (HCl). |

In the manner described in Preparation 1, the following methylamines and, as described in Preparation 2, the following higher alkyl amines are prepared from the correspondingly substituted ketone or aldehyde or diacetal thereof:

(7,9-dinitro-1,4-dioxaspiro[4.5]decan-2-yl-methyl)amine,
6,8,10-trichloro-1,4-dioxaspiro[4.5]decan-2-ylethyl)amine,
(6,8,10-trimethyl-1,4-dioxaspiro[4.5]decan-2-ylmethyl)amine,
(6-m-trifluoromethylphenethyl)-1,4-dioxaspiro[4.6]undecan-2-ylmethyl)amine,
(6-ethoxy-1,4-dioxaspiro[4.7]dodecan-2-ylethyl)amine,
(2-benzyloxymethyl-2-methyl-1,3-dioxolan-4-ylethyl)amine,
(2-(2-hydroxyethyl)-2-ethyl-1,3-dioxolan-4-yl-n-propyl)amine,
(2-m-acetamidophenyl-2-ethyl-1,3-dioxolan-4-ylmethyl)amine,
(2-(p-sulfatophenyl)-2-phenyl-1,3-dioxolan-4-ylethyl)amine,
(2-p-carboxyphenyl-2-methyl-1,3-dioxolan-4-ylethyl)amine,
(2-m-carbomethoxyphenyl-2-methyl-1,3-dioxolan-4-ylethyl)amine,
(2-cycloheptyl-2-methyl-1,3-dioxolan-4-yl-n-propyl)amine,
(2-cycloheptyl-2-cyclohexyl-1,3-dioxolan-4-ylethyl)amine,
(2-(10,11-dihydro-5H-dibenzo(a,d)-cycloheptatriene)-1,3-dioxolan-4-ylethyl)amine,
2,2-diphenyl-1,3-dioxolan-4-yl-i-butyl-amine,
(2-p-nitrobenzyl-2-isopropyl-1,3-dioxolan-4-yl-ethyl)amine,
(2-phenyl-2-ethyl-1,3-dioxolan-4-yl-n-pentyl-1)amine,
(2-α-naphthyl-2-methyl-1,3-dioxolan-4-yl-isobutyl)amine,
(2-(2'-indanylene)-1,3-dioxolan-4-ylethyl)amine,
(2-(9'-fluorenyl)-1,3-dioxolan-4-yl-ethyl)amine,
(2-phenyl-2-cyclopentyl-1,3-dioxolan-4-yl-methyl)amine,
(2,2-di-cyclohexyl-1,3-dioxolan-4-yl-ethyl)amine,
(2,2-di-isopropyl-1,3-dioxolan-4-yl-ethyl)amine,
spiro[1,3]-dioxolan-2,9'-fluorenylene-4-yl-i-propyl)amine,
(2-benzyl-2-(p-sulfatobenzyl) 1,3-dioxolan-4-yl-ethyl)amine,
(8-methyl-8-(o-trichloromethyl-phenyl)-1,4-dioxaspiro[4.5]decan-2-yl-ethyl)amine,
(8-chloro-1,4-dioxaspiro[4.5]decan-2-yl-ethyl)methylamine,
(2,2-diphenyl-1,3-dioxolan-4-yl-ethyl-i-propyl)amine,
(8-phenyl-8-(p-benzylphenyl) 1,4-dioxaspiro[4.5]decan-2-yl-methyl)amine,
(2-ethyl-2-phenyl-1,3-dioxolan-4-yl-hexyl)amine,
(8-(m-acetamido-phenyl)-1,4-dioxaspiro[4.5]decan-2-yl-ethyl)amine,
(8-chloro-1,4-dioxaspiro[4.5]decan-2-yl-ethyl)amine,
(2-benzyl-2-phenyl-1,3-dioxolan-4-yl-ethyl)amine,
(2,2-dibutyl-1,3-dioxolan-4-yl-n-propyl)amine,
(spiro[1,3-dioxolane-2,9'-fluorene]-4-yl-ethyl)amine,
(2,2-dioctyl-1,3-dioxolan-4-yl-methyl)amine,
(8-carboxymethyl-1,4-dioxaspiro[4.5]decane-2-ethyl)amine,
(8-phenoxymethyl-1,4-dioxaspiro[4.5]decane-2-n-propyl)amine,
(α-10'-bromo-spiro[1,3-dioxolane-2,5(5'H)dibenzo[a,d]cycloheptene]-4-yl-methyl)amine,
(10',11'-dihydro-spiro[1,3-dioxolane-2,5'(5'H)dibenzo[a,d]cycloheptene]-4-yl-ethyl)amine,
(2-cyclopropyl-2-phenyl-1,3-dioxolan-4-yl-methyl)amine,
(6-chloro-1,4-dioxaspiro[4.6]undecan-2-yl-methyl)amine,
(6-chloro-1,4-dioxaspiro[4.6]undecan-2-yl-ethyl)amine,
(6-phenyl-1,4-dioxaspiro[4.6]undecan-2-yl-ethyl)amine,
(6-phenyl-1,4-dioxaspiro[4.6]undecan-2-yl-propyl)amine,
(6-chloro-1,4-dioxaspiro[4.6]undecan-2-yl-propyl)amine,
(6-phenyl-1,4-dioxaspiro[4.5]decan-2-yl-ethyl)amine,
(6-chloro-1,4-dioxaspiro[4.5]decan-2-yl-ethyl)amine,
(6-phenyl-1,4-dioxaspiro[4.5]decan-2-yl-n-propyl)amine,
(6-chloro-1,4-dioxaspiro[4.5]decan-2-yl-n-propyl)amine, and
(8-benzyloxyphenyl-1,4-dioxaspiro[4.5]decan-2-yl-methyl)amine, respectively, and their corresponding acid addition salts, e.g., sulfate, tartarate hydrochloride.

EXAMPLE 1

(1,4-dioxaspiro[4.5]decan-2-ylmethyl)guanidine sulfate

A mixture of 10.5 g. of 1,4-dioxaspiro[4.5] decane-2-methylamine and 8.6 g. of 2-methyl-2-thiopseudourea sulfate in 40 ml. of water was heated on the steam bath for 4 hours during which 2.0 g. of methylmercaptan was collected in a Dry Ice bath connected to the reaction flask through a water cooled reflux condenser. The reaction mixture was then evaporated at 15 mm. pressure to a solid residue which was then dissolved in 80 ml. of 50/50 methanol-ethanol. The solution was filtered and evaporated to approximately 50 ml. volume and allowed to cool and crystallize, giving a crop melting at 213.5 to 215° of 1,4-dioxaspiro[4.5]decan-2-ylmethyl)-guanidine sulfate.

*Analysis.*—Calculated for (C$_{10}$H$_{19}$N$_3$O$_2$)$_2$·H$_2$SO$_4$ (percent): C, 45.79; H, 7.69; N, 16.02; S, 6.11. Found (percent): C, 45.97; H, 7.99; N, 15.76; S, 6.14.

Another preparation which incorporated ammonia in the final crystallization step gave a product with a higher melting point of 225–227° C. but a slightly poorer analysis. A sample of this material, when recrystallized from water, resulted apparently in the formation of another crystal form, melting at 242–245° dec. This appears to be the stable form since recrystallization from methanol-ethanol did not alter the melting point.

This compound, in addition to pronounced anti-hypertensive activity, stimulates growth of the male accessory reproductive organs.

The compound of Example 1 is a potent sympathetic nerve ending blocker and depletes norepinephrine from the stores. Its anti-hypertensive properties have been demonstrated in renal hypertensive dogs. It appears superior to other guanidine anti-hypertensive agents in the following respects. First, it is well tolerated in large doses and does not induce diarrhea in any of the species in which it was tested. Second, the compound of Example 1 crosses the blood brain barrier and has been shown to deplete hypothalamic norepinephrine. Depletion of hypothalamic norepinephrine may contribute to the antihypertensive activity of the compound. Third, the compound of Example 1 decreases the total catecholamine content of the adrenal gland.

EXAMPLE 2

(6-chloro-1,4-dioxaspiro[4.5]decan-2-ylmethyl) guanidine sulfate

Following the procedure of Example 1, 31 g. of 6-chloro-1,4-dioxaspiro[4.5]decane-2-methylamine, 23 g. of 2-methyl-2-thiopseudourea sulfate, and 75 ml. of water were heated for 2 hours and then evaporated at reduced pressure and the residue was recrystallized from methanol twice to give (6-chloro - 1,4 - dioxaspiro[4.5]decan-2-ylmethyl)guanidine sulfate, melting at 232–234°.

*Analysis.* — Calculated for $(C_{10}H_{18}ClN_3O_2)_2 \cdot H_2SO_4$ (percent): C, 40.47; H, 6.45; N, 14.16. Found (percent): C, 40.32; H, 6.59; N, 14.31.

This compound possesses uterotrophic activity in addition to marked anti-hypertensive activity.

EXAMPLE 3

(8-chloro-1,4-dioxaspiro[4.5]decan-2-ylmethyl) guanidine

Following the procedure of Example 2, 8-chloro-1,4-dioxaspiro[4.5]decan-2 - yl - methylamine when reacted with 2-methyl-2-thiopseudourea sulfate gives (8-chloro-1,4-dioxaspiro[4.5]decan-2-ylmethyl)guanidine sulfate.

EXAMPLE 4

(8-methyl-1,4-dioxaspiro[4.5]decan-2-ylmethyl) guanidine sulfate

In 30 ml. of water were dissolved 11.5 g. of 8-methyl-1,4-dioxaspiro-[4.5]decane-2-methylamine sulfate, 6.8 g. of 2-methyl-2-thiopseudurea sulfate, and 2.0 g. of sodium hydroxide. The solution was heated for 4.5 hours on the steam bath and was then evaporated at reduced pressure to a solid. This was dissolved in 90 ml. of an equal part mixture of methanol-ethanol-water. The solution was filtered and then evaporated to about ⅔ volume and then allowed to stand. Three successive crops of crystals were obtained at room temperature and at +2. These were combined and recrystallized from 17 percent water in methanol to give (8-methyl-1,4-dioxaspiro[4.5]decan-2-yl-methyl)guanidine sulfate melting at 259°.

*Analysis.*—Calculated for $(C_{11}H_{21}N_3O_2)_2 \cdot H_2SO_4$ (percent): C, 47.81; H, 8.02; N, 15.21. Found (percent): C, 47.91; H, 8.10; N, 14.96.

This compound possesses anti-hypertensive activity.

EXAMPLE 5

(7,7,9,9-tetramethyl-1,4-dioxaspiro[4.5]decan-2-ylmethyl)guanidine sulfate

Following the procedure of Example 1, 34 g. of 7,7,9,9-tetramethyl-1,4-dioxaspiro[4.5]decane - 2 - methylamine and 23 g. of 2-methyl-2-thiopseudourea sulfate were dissolved in 50 ml. of water and reacted for 2 hours. The product melted at 254–256° after one recrystallization from methanol.

*Analysis.*—Calculated for $(C_{14}H_{27}N_3O_2)_2 \cdot H_2SO_4$ (percent): C, 52.81; H, 8.86; N, 13.20. Found (percent): C, 52.81; H, 8.63; N, 13.11.

This compound possesses anti-hypertensive activity.

EXAMPLE 6

(8-methoxy-1,4-dioxaspiro[4.5]decan-2-ylmethyl) guanidine sulfate

By the procedure of Example 1, 37.6 g. of 8-methoxy-1,4-dioxaspiro[4.5]decane - 2 - methylamine was reacted with 23 g. of 2-methyl-2-thiopseudourea sulfate. The recrystallization of the product from isopropanol was very slow. A second and third crop were obtained by dilution of the mother liquor with ether. The crops were combined and recrystallized from isopropanol and then from methanol. The impure product was then dissolved in aqueous caustic at pH 11. The solution was then washed with ether and finally readjusted to pH 7.4. The water was removed at reduced pressure and the residue was recrystallized from ethanol by ether dilution to give (8-methoxy-1,4-dioxaspiro[4.5]decan-2 - ylmethyl)guanidine sulfate, melting at 216–218°.

*Analysis.*—Calculated for $(C_{11}H_{21}N_3O_3)_2 \cdot H_2SO_4$ (percent): C, 45.19; H, 7.59; N, 14.37. Found (percent): C, 44.96; H, 7.73; N, 14.51.

This compound possesses anti-hypertensive activity.

EXAMPLE 7

(6-phenyl-1,4-dioxaspiro[4.5]decan-2-ylmethyl) guanidine sulfate

Following the procedure of Example 1, 39 g. of 6-phenyl-1,4-dioxaspiro[4.5]decane - 2 - methylamine was reacted with 23 g. of 2-methyl-2-thiopseudourea sulfate to give a crystalline residue after removal of the reaction solvent at reduced pressure. The residue was washed with concentrated aqueous potassium bicarbonate and then triturated first with ether and then with ether-ethanol to give (6-phenyl-1,4-dioxaspiro[4.5]decan-2-ylmethyl) guanidine sulfate, melting at 244–245° dec.

*Analysis.*—Calculated for $(C_{16}H_{23}N_3O_2)_2 \cdot H_2SO_4$ (percent): C, 56.79; H, 7.15; N, 12.42; S, 4.74. Found (percent): C, 53.01; H, 7.23; N, 12.37; S, 4.51.

This compound possesses anti-hypertensive activity.

EXAMPLE 8

Following the procedure of Example 7, 8-phenyl-1,4-dioxaspiro[4.5]decane-2-methylamine when reacted with 2-methyl-2-thiopseudourea sulfate gave (8-phenyl-1,4-dioxaspiro[4.5]decane-2-ylmethyl)guanidine sulfate.

EXAMPLE 9

(1,4-dioxaspiro[4.6]undecan-2-ylmethyl)guanidine sulfate

By the procedure described in Example 1, 28 g. of 1,4-dioxaspiro[4.6]undecane-2-methylamine was reacted with 20 g. of 2-methyl-2-thiopseudourea sulfate in 50 ml. of water for approximately 2 hours during which a heavy precipitate formed. It was separated and re-crystallized from methanol twice to give (1,4-dioxaspiro[4.6]undecan-2-yl-methyl)guanidine sulfate, M.P. 225–256°.

*Analysis.*—Calculated for $(C_{11}H_{21}N_3O_1)_2 \cdot H_2SO_4$ (percent): C, 47.81; H, 8.02; N, 15.21; S, 5.80. Found (percent): C, 47.85; H, 8.01; N, 16.02; S, 5.71.

This compound, in addition to strong anti-hypertensive activity, blocks the cardiac-conditioning response and has anti-inflammatory activity by the limb volume test.

EXAMPLE 10

(1,4-dioxaspiro[4.7]dodecan-2-ylmethyl)guanidine sulfate

Following the procedure of Example 1, 32 g. of 1,4-dioxaspiro[4.7]-dodecane-2-methylamine, 23 g. of 2-methyl-2-thiopseudourea sulfate, and 75 ml. of water were heated for 1.5 hours and then allowed to stand overnight when a heavy precipitate formed and was filtered off. It was recrystallized from methanol, to give (1,4-dioxaspiro[4.7]dodecan-2-ylmethyl)guanidine sulfate, melting at 260–261°.

*Analysis.*—Calculated for $(C_{12}H_{23}N_3O_2)_2 \cdot H_2SO_4$ (percent): C, 49.64; H, 8.33; N, 14.47. Found (percent): C, 49.41; H, 8.12; N, 14.61.

This compound possesses anti-inflammatory activity in addition to anti-hypertensive activity.

EXAMPLE 11

[spiro(1,3-dioxolane-2,2'-indan)-4-ylmethyl]guanidine sulfate

According to the procedure of Example 1, 20 g. of spiro(1,3-dioxolane-2,2'-indan)-4-methylamine, 14 g. of 2-methyl-2-thiopseudourea sulfate, and 65 ml. of water were heated on the steam bath and upon cooling a heavy precipitate formed which was filtered from the mother liquor and recrystallized from 200 ml. of ethanol to give [spiro(1,3-dioxolane - 2,2' - indan)-4-ylmethyl]-guanidine sulfate, melting at 234–235°.

Analysis.—Calculated for $(C_{13}H_{17}N_3O_2)_2 \cdot H_2SO_4$ (percent): C, 52.69; H, 6.12; N, 14.18. Found (percent): C, 52.50; H, 6.06; N, 14.29.

This compound possesses anti-hypertensive activity.

EXAMPLE 12

(1,4-dioxaspiro[4.4]non-2-ylmethyl)guanidine sulfate

Following the procedure of Example 1, 35 g. of 1,4-dioxaspiro-[4.4]-nonane-2-methylamine and 21 g. of 2-methyl-2-thiopseudourea sulfate were reacted in 30 ml. of water. Evaporation at reduced pressure and re-evaporation after adding propanol to the residue gave an amorphous product which crystallized when stirred with 50 ml. of ethanol. The mixture was diluted with 200 ml. of dry ether and filtered. The crude product was recrystallized from ethanol and then from methanol to give (1,4-dioxaspiro[4.4]non - 2 - methyl) guanidine sulfate, melting at 205° dec.

Analysis.—Calculated for $(C_9H_{17}N_3O_2)_2 \cdot H_2SO_4$: (percent): C, 42.97; H, 7.01; N, 16.92; S, 6.45. Found (percent): C, 43.64; H, 7.15; N, 16.86; S. 6.54.

This compound possesses anti-hypertensive activity.

EXAMPLE 13

(1,3-dioxolan-4-ylmethyl)guanidine sulfate

Using the procedure of Example 1, 15.3 g. of 1,3-dioxolane-4-methylamine was reacted with 13.9 g. of 2-methyl-2-thiopseudourea sulfate. The reaction mixture was evaporated at reduced pressure on the steam bath to a colorless amorphous semi-solid. It was dissolved in 170 ml. of methanol and re-evaporated to an amorphous solid at high vacuum. This material was triturated with anhydrous ether to give an amorphous solid which was pulverized and triturated with fresh anhydrous ether to give a white powder which softened at approximately 60° and melted at 100° with decomposition.

Analysis.—Calculated for $(C_5H_{11}N_3O_2)_2 \cdot H_2SO_4$ (percent): C, 30.92; H, 6.23; N, 21.64. Found (percent): C, 30.7; H, 6.0; N, 20.8.

This compound, in addition to anti-hypertensive activity, is a lipase inhibitor.

EXAMPLE 14

(2,2-dimethyl-1,3-dioxolan-4-ylmethyl)guanidine sulfate

By the procedure of Example 1, 29.5 g. of 2,2-dimethyl-1,3-dioxolane-4-methylamine was reacted with 21 g. of 2-methyl-2-thiopseudoura sulfate. The crude produce was recrystallized twice from propanol without prior treatment with ether. It was finally recrystallized from 95 percent ethanol to give (2,2-dimethyl-1,3-dioxolan-4-ylmethyl)guanidine sulfate, melting at 181°.

Analysis.—Calculated for $(C_7H_{15}N_3O_2)_2 \cdot H_2SO_4$ (percent): C, 37.83; H, 7.26; N, 18.91. Found (percent): C, 37.84; H, 7.20; N, 18.66.

This compound possesses anti-hypertensive activity.

EXAMPLE 15

(2,2-dimethyl-1,3-dioxolan-4-ylmethyl)guanidine sulfate

Following the procedure of Example 1, 20 g. of 2,2-diethyl-1,3-dioxolane-4-methylamine and 14 g. of 2-methyl-2-thiopseudourea sulfate were reacted in 25 ml. of water. The product precipitated as a crystalline solid upon cooling the reaction mixture and was filtered. It was recrystallized from ethanol to give (2,2-diethyl-1,3-dioxolan-4-ylmethyl)guanidine sulfate, melting at 229–231°.

Analysis.—Calculated for $(C_9H_{19}N_3O_2)_2 \cdot H_2SO_4$ (percent): C, 43.19; H, 7.65; N, 16.79. Found (percent): C, 43.19; H, 7.61; N, 16.62.

This compound possesses anti-hypertensive activity.

EXAMPLE 16

(2,2-dimethyl-1,3-dioxolan-4-ylmethyl)guanidine hydrochloride

A mixture of 5.2 g. of 2,2-diisopropyl-1,3-dioxolane-4-methylamine and 4.0 g. of 2-methyl-2-thiopseudourea hydrochloride in 25 ml. of water was heated on the steam bath for one hour. Then the solvent was evaporated at reduced pressure and the residue was dissolved in 25 ml. of hot isopropyl and the solution was re-evaporated to a residue at reduced pressure. The residue was again dissolved in isopropanol and set aside at +2° for 3 days and a precipitate of 0.8 g. was filtered off. The filtrate was concentrated partially and allowed to stand for several days when it became crystalline. The mass was washed with hot ethylacetate, filtered, and dried to give crystals, melting at 143–145°, of (2,2-diisopropyl-1,3-dioxolan-4-ylmethyl)guanidine hydrochloride.

Analysis.—Calculated for $C_{11}H_{23}N_3O_2 \cdot HCl$: C, 49.71; H, 9.10; N, 15.81. Found (percent): C, 49.42; H, 9.34; N, 15.49.

This compound possesses anti-hypertensive activity.

EXAMPLE 17

(2,2-dimethyl-1,3-dioxolan-4-ylmethyl)guanidine sulfate

By the procedure of Example 1, 17.4 g. of 2,2-dipropyl-1,3-dioxolane-4-methylamine and 20.8 g. of 2-methyl-2-thiopseudourea sulfate in 30 ml. of water were reacted for 3 hours and the volatile material was then removed at reduced pressure. The residue was treated with 50 ml. of ethanol and re-evaporated to a heavy sirup which was dissolved in 100 ml. hot isopropanol, filtered, and diluted with about 200 ml. of ethyl acetate to give a crystalline precipitate. This crop was recrystallized from 30 ml. of water to give (2.2-dipropyl-1,3-dioxolan - 4 - ylmethyl)-guanidine sulfate melting at 175–178°.

Analysis.—Calculated for $(C_{11}H_{23}N_3O_2)_2 \cdot H_2SO_4$ (percent): C, 47.46; H, 8.69; N, 15.10. Found (percent): C, 47.16; H, 8.35; N, 15.18.

This compound possesses anti-hypertensive activity.

EXAMPLE 18

(2,2-diphenyl-1,3-dioxolan-4-ylmethyl)guanidine sulfate 9.1 grams of 2,2-diphenyl-1,3-dioxolane-4-methylamine hydrochloride was suspended in 20 ml. of 10 percent aqueous sodium hydroxide and extracted with two 40 ml. portions of ether. The combined extracts were dried and evaporated to an oil which was treated with 4.8 g. of 2-methyl-2-thiopseudourea sulfate as described in Example 1 for a period of 2 hours. The reaction mixture was evaporated at reduced pressure to a white solid which was then recrystallized from approximately 250 ml. of 50/50 ethanol-water 3 times to give (2,2-diphenyl-1,3-dioxolan-4-ylmethyl)guanidine sulfate, M.P. 229°.

Analysis.—Calculated for $(C_{17}H_{19}N_3O_2)_2 \cdot H_2SO$ (percent): C, 58.94; H, 5.82; N, 12.13. Found (percent): C, 59.00; H, 6.08; N, 12.20.

This compound, in addition to mild anti-hypertensive activity, has anti-inflammatory activity, is a lipase inhibitor and decreases post-prandial lipemia of rats.

EXAMPLE 19

(2,2-dicyclohexyl-1,3-dioxolan-4-ylmethyl)guanidine hydrochloride

A solution of 27 g. of 2,2-dicyclohexyl-1,3-dioxolane-4-methylamine in 40 ml. of ethanol was mixed with 13 g.

of 2-methyl-2-thiopseudourea hydrochloride dissolved in 60 ml. of ethanol in a flask connected by a closed system through a water-cooled reflux condenser to a Dry Ice trap. The flask was then heated on the steam bath to reflux 3 hours during which time 2.5 g. of methylmercaptan was collected. The reaction mixture was then diluted with 75 ml. of ether. Two liquid phases formed and the aqueous phase, a heavy sirup, was separated. It was diluted wtih water and washed with fresh ether and then allowed to stand at +2° for two days when a precipitate was separated. It was recrystallized from 25 ml. of water and then from methanol-ethylacetate to give (2,2-dicyclohexyl-1,3-dioxolan-4-ylmethyl)guanidine hydrochloride, melting at 86–90°.

*Analysis.*—Calculated for $C_{17}H_{31}N_3O_2 \cdot HCl$ (percent): C, 58.85; H, 9.59; N, 12.11. Found (percent): C, 57.4; H, 9.4; N, 12.09.

This compound possesses lipase inhibiting as well as anti-hypertensive activity.

EXAMPLE 20

[2-(1,4-dioxaspiro[4.5]decan-2-yl)ethyl]guanidine sulfate

Following the above procedure, 11.0 g. of 1,4-dioxaspiro[4.5]decane-2-ethyl-amine and 8.1 g. of 2-methyl-2-thiopseudourea sulfate in 25 ml. of water was heated on the steam bath for 2 hours. The solution was evaporated to one-half its volume and the precipitate which formed was recrystallized from ethanol-methanol, dried, to give crystals, melting at 261–263°, of [2-(1,4-dioxaspiro[4.5]decan-2-yl)ethyl]guanidine sulfate.

*Analysis.*—Calculated for $(C_{11}H_{15}N_3O_2) \cdot H_2SO_4$ (percent): C, 48.88; H, 5.97; N, 15.55. Found (percent): C, 49.04; H, 6.10; N, 15.57.

This compound possesses anti-hypertensive activity.

EXAMPLE 21

(2-ethyl-2-phenyl-1,3-dioxolan-4-yl-methy)-guanidine sulfate

By the above-procedure, 37.5 g. of 2-ethyl-2-phenyl-1,3-dioxolane-4-methyl-amine and 20.5 g. of 2-methyl-2-thiopseudourea sulfate in 25 ml. of water was heated on the steam bath for 2 hours; the water was removed and the residue was triturated with benzene, then ether to induce crystallization. The material was recrystallized three times from ethanol, to give (2-ethyl-2-phenyl-1,3-dioxolan-4-yl-methyl)-guanidine sulfate, melting at 211–212.5°.

*Analysis.*—Calculated for $C_{13}H_{19}N_3O_2 \cdot H_2SO_4$ (percent): C, 52.33; H, 6.76; N, 14.08. Found (percent): C, 52.45; H, 7.01; N, 14.31.

This compound is hypotensive.

EXAMPLE 22

2-phenyl-1,3-dioxolan-4-ylmethyl-guanidine sulfate

By the above procedure 2-phenyl-1,3-dioxolane-4-yl-methylamine and 2-methyl-2-thiopseudourea sulfate when heated on the steam bath in water, gave 2-phenyl-1,3-dioxolan-4-ylmethyl-guanidine sulfate which after recrystallization had a melting point of 150–151.5° C.

*Analysis.*—Calculated for $(C_{11}H_{15}N_3O_2)_2 \cdot H_2SO_4$ (percent): C, 48.88; H, 5.97; N, 15.55. Found (percent): C, 49.04; H, 6.10; N, 15.57.

By the above procedure of Example 1, 2-ethyl-2-phenyl-1,3-dioxolane - 4 - ethylamine and 2 - methyl - 2 thiopseudourea sulfate, when heated on the steam bath in water, gives (2-ethyl-2-phenyl-1,3-dioxolan-4-yl-ethyl) guanidine sulfate. Similarly, when an amine listed in the table following Table II is heated on the steam bath with 2-methyl-2-thiopseudourea the following guanidines are obtained:

(7,9-dinitro-1,4-dioxaspiro[4.5]decan-2-yl-methyl)guanidine sulfate,
(6,8,10-trichloro-1,4-dioxaspiro[4.5]decan-2-ylethyl) guanidine sulfate,
(6,8,10-trimethyl-1,4-dioxaspiro[4.5]decan-2-ylmethyl) guanidine sulfate,
(6-trifluoromethylphenethyl)-1,4-dioxaspiro[4.6] undecan-2-ylmethyl)guanidine sulfate,
(6-ethoxy-1,4-dioxaspiro[4.7]dodecan-2-ylmethyl) guanidine sulfate,
(2-benzyloxymethyl-2-methyl-1,3-dioxolan-4-ylethyl) guanidine sulfate,
(2-(2-hydroxyethyl)-2-ethyl-1,3-dioxolan-4-yl-n-propyl)guanidine sulfate,
(2-m-acetamidophenyl-2-ethyl-1,3-dioxolan-4-ylmethyl) guanidine sulfate,
(2-(p-sulfatophenyl)-2-phenyl-1,3-dioxolan-4-ylethyl) guanidine sulfate,
(2-p-carboxyphenyl-2-methyl-1,3-dioxolan-4-ylethyl) guanidine sulfate,
(2-m-carbomethoxyphenyl-2-methyl-1,3-dioxolan-4-ylethyl)guanidine sulfate,
(2-cyclohepyl-2-methyl-1,3-dioxolan-4-n-propyl) guanidine sulfate,
(2-cycloheptyl-2-cyclohexy-1,3-dioxolan-4-ylethyl) guanidine sulfate,
(2-(10,11-dihydro-5H-dibenzo(a,d)-cycloheptatriene)-1,3-dioxolan-4-ylethyl)guanidine sulfate,
2,2-diphenyl-1,3-dioxolan-4-yl-i-butyl-guanidine sulfate,
(2-p-nitrobenzyl-1-2-isopropyl-1,3-dioxolan-4-yl-ethyl) guanidine sulfate,
(2-phenyl-2-ethyl-1,3-dioxolan-4-yl-n-pentyl)guanidine sulfate,
(2-α-napthyl-2-methyl-1,3-dioxolan-4-yl-isobutyl) guanidine sulfate,
(2-(2'-indanylene)-1,3-dioxolan-4-yl-ethyl)guanidine sulfate,
(2-(9'-fluorenyl)-1,3-dioxolan-4-yl-ethyl)guanidine sulfate,
(2-phenyl-2-cyclopentyl-1,3-dioxolan-4-yl-methyl) guanidine sulfate,
(2,2-di-cyclohexyl-1,3-dioxolan-4-yl-ethyl)guanidine sulfate,
(2,2-di-isopropyl-1,3-dioxolan-4-yl-ethyl)guanidine sulfate,
spiro[1,3]-dioxolane-2,9'-fluorenylene-4-yl-i-propyl) guanidine sulfate,
(2-benzyl-2-(p-sulfatobenzyl)-1,3-dioxolan-4-yl-ethyl guanidine sulfate,
(8-methyl-8-(o-trichloromethyl-phenyl)-1,4-dioxaspiro[4.5]decan-2-yl-ethyl)granidine sulfate,
(8-chloro-1,4-dioxaspiro[4.5]decan-2-yl-ethyl) guanidine sulfate.
(2,2-diphenyl-1,3-dioxolan-4-yl-ethyl-i-propyl)guanidine sulfate,
(8-phenyl-8-(p-benzylphenyl)-1,4-dioxaspiro[4.5]decan-2-yl-methyl)guanidine sulfate,
(2-ethyl-2-phenyl-1,3-dioxolan-4-yl-hexyl)guanidine sulfate,
(8-(m-acetamido-phenyl)-1,4-dioxaspiro[4.5]decan-2-yl-ethyl)guanidine sulfate,
(8-chloro-1,4-dioxaspiro[4,5]decan-2-yl-ethyl) guanidine sulfate,
(2-benzyl-2-phenyl-1,3-dioxolan-4-yl-ethyl)guanidine sulfate,
(2,2-dibutyl-1,3-dioxolan-4-yl-n-propyl)guanidine sulfate,
(spiro[1,3-dioxolane-2,9'-fluorene]4-yl-ethyl)guanidine sulfate,
(2,2-dioctyl-1,3-dioxolan-4-yl-methyl)guanidine sulfate,
(8-carboxymethyl-1,4-dioxaspiro[4.5]decane-2-ethyl) guanidine sulfate,
(8-phenoxymethyl-1,4-dioxaspiro[4.5]decane-2-n-propyl)guanidine sulfate,
(α-10'-bromo-spiro[1,3-dioxolane-2,5(5'H)dibenzo [a,d]cycloheptene]4-yl-methyl]guanidine sulfate,
(10',11'-dihydro-spiro[1,3-dioxolane-2,5'(5'H)dibenzo [a,d]cycloheptene]4-yl-ethyl)guanidine sulfate, (2-cyclopropyl-2-phenyl-1,3-dioxolan-4-yl-methyl) guanidine sulfate,
(6-chloro-1,4-dioxaspiro[4.6]undecan-2-yl-methyl) guanidine sulfate,
(6-chloro-1,4-dioxaspiro[4.6]undecan-2-yl-ethyl) guanidine sulfate,
(6-phenyl-1,4-dioxaspiro[4.6]undecan-2-yl-ethyl) guanidine sulfate,
(6-phenyl-1,4-dioxaspiro[4.6]undecan-2-yl-propyl) guanidine sulfate,
(6-chloro-1,4-dioxaspiro[4.6]undecan-2-yl-propyl) guanidine sulfate,
(6-phenyl-1,4-dioxaspiro[4.5]decan-2-yl-ethyl)guanidine sulfate,
(6-chloro-1,4-dioxaspiro[4.5]decan-2-yl-ethyl)guanidine sulfate,
(6-phenyl-1,4-dioxaspiro₁4.5]decan-2-yl-n-propyl) guanidine sulfate,
(6-chloro-1,4-dioxaspiro[4.5]decan-2-yl-n-propyl) guanidine sulfate, and
(8-benzyloxyphenyl-1,4-dioxaspiro[4.5]decan-2-yl-methylguanidine sulfate, respectively. Other acid addition salts of each of the above, e.g., the hydrochloride, tartarate, of each of the above, are prepared from the free base.

What is claimed is:
1. A compound of the formula

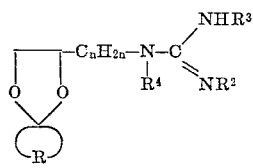

wherein $n$ is an integer from 1–8; $R^2$, $R^3$ and $R^4$ each are members of the group consisting of hydrogen and lower-alkyl; and R is an alkylene group containing 4 to 9 carbon atoms in the chain, with the proviso that when the alkylene group contains 4–5 carbon atoms, the chain can have fused thereto from 1 to 2 benzo rings, or the corresponding alkylene group substituted with up to 4 members of the group consisting of halo, lower-alkyl, trifluoromethyl, trichloromethyl, lower-alkoxy, benzyloxy, phenoxy, phenyl, hydroxy, carboxy, carbo-lower-alkoxy, nitro, sulfato and acetamido, said R group having a molecular weight less than 300.

2. A compound of claim 1 wherein $R^2$, $R^3$ and $R^4$ each are hydrogen and $n$ is 1.

3. A compound of claim 1 selected from the group consisting of 1,4-dioxaspiro[4.5]decan-2-ylmethyl)guanidine and the pharmaceutically acceptable acid addition salts thereof.

4. A compound of claim 1 selected from the group consisting of (6 - chloro - 1,4 - dioxaspiro[4.5]decan - 2 - yl-methyl)guanidine and the pharmaceutically acceptable acid addition salts thereof.

5. A compond of claim 1 selected from the group consisting of (1,4-dioxaspiro[4.6]undecan-2-yl-methyl)guanidine and the pharmaceutically acceptable addition salts thereof.

6. (6 - phenyl - 1,4 - dioxaspiro[4.5]decan - 2 - yl-methyl)guanidine sulfate.

References Cited
UNITED STATES PATENTS
3,248,426    4/1966    Dvornick _____ 260—564

ALEX MAZEL, Primary Examiner
J. H. TURNIPSEED, Assistant Examiner

U.S. Cl. X.R.
424—278

UNITED STATES PATENT OFFICE
CERTIFICATE OF CORRECTION

Patent No. 3,547,951      Dated December 15, 1970

Inventor(s) Waldo R. Hardie and Joseph E. Aaron      PAGE

It is certified that error appears in the above-identified patent and that said Letters Patent are hereby corrected as shown below:

Column 2, lines 6-12, change

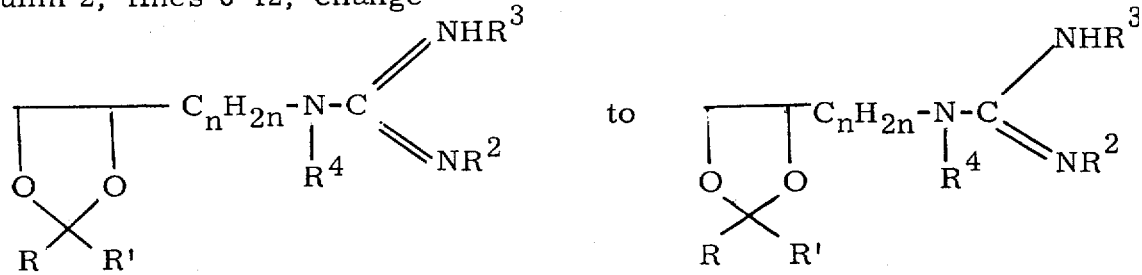

Column 4, lines 21-23, change

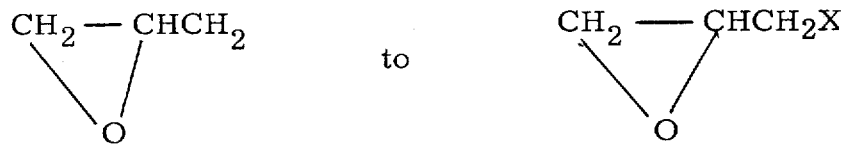

UNITED STATES PATENT OFFICE
CERTIFICATE OF CORRECTION

Patent No. 3,547,951          Dated December 15, 1970

Inventor(s) Waldo R. Hardie and Joseph E. Aaron     PAGE - 2

It is certified that error appears in the above-identified patent and that said Letters Patent are hereby corrected as shown below:

Column 4, lines 26-34, change

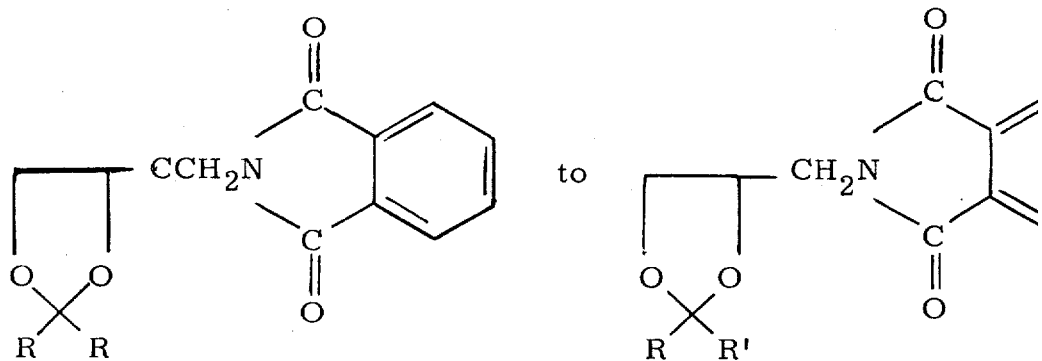

Column 4, lines 41-46, change

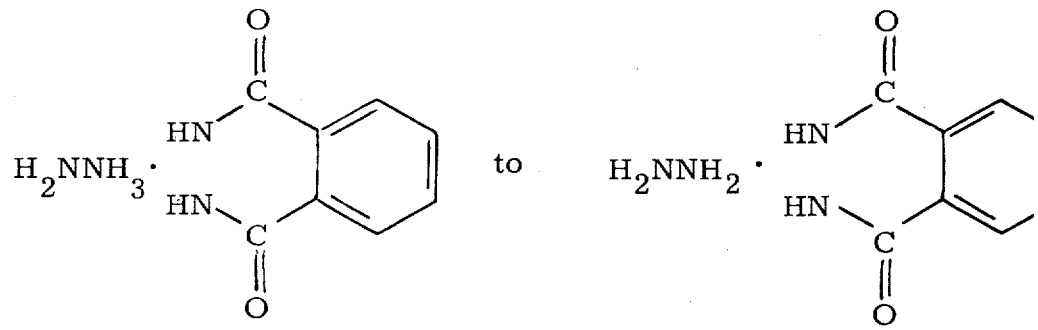

FORM PO-1050 (10-69)

UNITED STATES PATENT OFFICE
CERTIFICATE OF CORRECTION

Patent No. 3,547,951　　　　　　　Dated December 15, 1971

Inventor(s)　　Waldo R. Hardie and Joseph E. Aaron　PAGE - 3

It is certified that error appears in the above-identified patent and that said Letters Patent are hereby corrected as shown below:

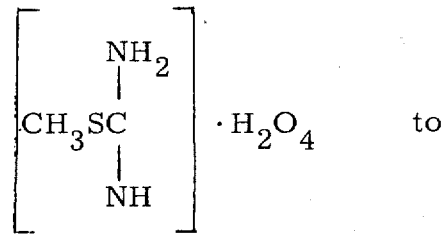　　to　　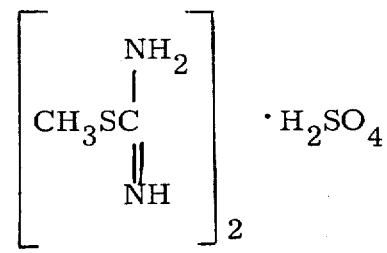

UNITED STATES PATENT OFFICE
CERTIFICATE OF CORRECTION

Patent No. 3,547,951          Dated December 15, 1970

Inventor(s) Waldo R. Hardie and Joseph E. Aaron    PAGE-4

It is certified that error appears in the above-identified patent and that said Letters Patent are hereby corrected as shown below:

Column 12, for compound 11, change "$-CH_2-o-_6CH_4)-CH_2-$" to

--- $-CH_2-(o-C_6H_4)-CH_2-$ ---

Column 12, for compound 23, change "$o-CH_3CO_6H_4$" to -- $o-CH_3OC_6H$

Column 12, for compound 23, change "(p-TSO)" to --(p-TSA)--

Column 13, line 25, for compound 38, change "$C_5H_5$" to -- $C_6H_5$ --

Column 14, line 60, change "242-245°" to -- 243-245° --

Column 16, line 51, change "225" to -- 255 --

Column 16, line 52, change "$(C_{11}H_{21}N_3O_1)_2$" to -- $(C_{11}H_{21}N_3O_2)_2$ --

Column 17, line 29, change "(1,4-dioxaspiro[4.4]non-2-methyl)" to

-- (1,4-dioxaspiro[4.4]non-2-ylmethyl) --

Column 17, line 59, change "methyl-2-thiopseudoura" to

-- methyl-2-thiopseudourea --

Column 17, line 70, change "(2,2-dimethyl-" to -- (2,2-diethyl- --

UNITED STATES PATENT OFFICE
CERTIFICATE OF CORRECTION

Patent No. 3,547,951  Dated December 15, 1970

Inventor(s) Waldo R. Hardie and Joseph E. Aaron   PAGE - 5

It is certified that error appears in the above-identified patent and that said Letters Patent are hereby corrected as shown below:

Column 18, line 9, change "(2,2-dimethyl-" to -- (2,2-diisopropyl-

Column 18, line 32, change "(2,2-dimethyl-" to -- (2,2-dipropyl- --

Column 18, line 43, change "(2.2-" to -- (2,2- --

Column 19, line 8, change "wtih" to --with--

Column 19, line 39, change "-methy)" to -- -methyl)--

Column 19, line 48, change "$C_{13}H_{19}N_3O_2 \cdot H_2SO_4$" to --$(C_{13}H_{19}N_3O_2) \cdot H_2SO_4$ --

Column 20, line 3, change "(6-trifluoromethylphenethyl)" to --(6-m-trifluoromethylphenethyl)--

Column 20, line 5, change "-2-ylmethyl)" to -- -2-ylethyl) --

Column 20, line 19, change "dioxolan-4-n-propyl)" to -- dioxolan-4-yl propyl) --

Column 20, line 21, change "-cyclohexy-" to -- -cyclohexyl- --

Column 20, line 26, change "-1-2-isopropyl-" to -- -2-isopropyl- --

UNITED STATES PATENT OFFICE
CERTIFICATE OF CORRECTION

Patent No. 3,547,951         Dated December 15, 1970

Inventor(s) Waldo R. Hardie and Joseph E. Aaron    PAGE - 6

It is certified that error appears in the above-identified patent and that said Letters Patent are hereby corrected as shown below:

Column 20, line 46, change "granidine" to --guanidine--

Column 21, line 17, change "-dioxaspiro$_1$ 4.5]" to -- dioxaspiro [4.5

Signed and sealed this 15th day of February 1972.

(SEAL)
Attest:

EDWARD M. FLETCHER, JR.           ROBERT GOTTSCHALK
Attesting Officer                 Commissioner of Patents